(12) United States Patent
Richards et al.

(10) Patent No.: US 10,168,466 B2
(45) Date of Patent: Jan. 1, 2019

(54) CORNER CUT LIQUID CRYSTAL DISPLAY

(71) Applicant: Facebook Technologies, LLC, Menlo Park, CA (US)

(72) Inventors: Evan M. Richards, Santa Clara, CA (US); Shizhe Shen, San Mateo, CA (US); Jianru Shi, Union City, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/413,097

(22) Filed: Jan. 23, 2017

(65) Prior Publication Data

US 2018/0210139 A1   Jul. 26, 2018

(51) Int. Cl.
*F21V 8/00* (2006.01)

(52) U.S. Cl.
CPC ......... *G02B 6/0068* (2013.01); *G02B 6/0021* (2013.01); *G02B 6/0046* (2013.01)

(58) Field of Classification Search
CPC .......................... G02B 27/017; G02B 6/0048
See application file for complete search history.

(56) References Cited

U.S. PATENT DOCUMENTS

| | | | | |
|---|---|---|---|---|
| 2006/0077688 A1* | 4/2006 | Uehara | ................. | G02B 6/0046 362/613 |
| 2009/0274419 A1* | 11/2009 | Sayers | .................. | G02B 6/001 385/36 |
| 2011/0267563 A1* | 11/2011 | Shimizu | ................. | G02B 6/008 349/65 |
| 2012/0147293 A1* | 6/2012 | Dunn | ................ | G02F 1/133603 349/65 |
| 2014/0327602 A1* | 11/2014 | Hiraide | .............. | G02B 27/0172 345/8 |
| 2016/0260406 A1* | 9/2016 | Seen | ..................... | G02B 6/0068 |
| 2017/0371087 A1* | 12/2017 | You | ....................... | G02B 6/0021 |
| 2018/0118090 A1* | 5/2018 | Lee | ....................... | G02B 6/0048 |

* cited by examiner

*Primary Examiner* — Michael Caley
*Assistant Examiner* — Mariam Qureshi
(74) *Attorney, Agent, or Firm* — Fenwick & West LLP

(57) ABSTRACT

A corner cut liquid crystal display (LCD) device including a LCD panel and a backlight. The LCD panel includes adjacent panel portions of different width that collectively define a corner cut profile shape for the LCD panel. The backlight includes a light guide and light sources that emit light into the light guide. The backlight directs the light from the light sources toward the LCD panel. The light guide includes adjacent light guide portions of different width that define the corner cut profile shape. Each light guide portion illuminates a corresponding LCD panel portion. The LCD device can be incorporated into a head-mounted display (HMD). The corner cut profile shapes of two adjacent LCD devices, one for the left eye and one for the right eye, may define an open region for placement of other components or parts of the user, such as the user's nose when wearing the HMD.

15 Claims, 15 Drawing Sheets

FIG. 11  Middle Open region 1102

CORNER CUT LIQUID CRYSTAL DISPLAY

BACKGROUND

Head-mounted displays (HMDs) use electronic displays to provide content to users, such as content for virtual reality (VR), augmented reality (AR), or mixed reality (MR) applications. The light emitted from the electronic display may be passed through an optics block including optical elements (e.g., lenses) that adjust the focal distance between the electronic display and the user's eye. The optical elements of the optics block tend to have heavy amounts of distortion at the wide field angles, which makes utilization of the corners of a rectangular electronic display undesirable in the HMD.

SUMMARY

A liquid crystal display (LCD) device includes an LCD panel and a backlight. The LCD panel and backlight include a corner cut profile shape that excludes corner portions of rectangular displays that are distorted by optical elements when the LCD device is used in an HMD, while providing one or more open regions within the HMD for placement of other components. The LCD panel including at least a first portion and a second portion adjacent to the first portion, the first portion having a first width and the second portion having a second width smaller than the first width; and a backlight for illuminating the LCD panel. The backlight is disposed behind the LCD panel and includes: a first light guide portion of a light guide disposed behind the first portion of the LCD panel, the first light guide portion having the first width; a first light emitting diode (LED) disposed along a side surface of the first light guide portion to emit first light in a first direction along the first width of the first light guide portion, the first light guide portion receiving the first light from the first LED and directing the first light in a second direction toward the first portion of the LCD panel; a second light guide portion of the light guide disposed behind the second portion of the LCD panel adjacent to the first light guide portion, the second light guide having the second width; and a second LED disposed along a side surface of the second light guide portion to emit second light in the first direction along the second width of the second light guide portion, the second light guide portion receiving the second light from the second LED and directing the second light in the second direction toward the second portion of the LCD panel.

Some embodiments may include a head-mounted display (HMD) including one or more LCD devices each including a LCD panel and backlight with corner cut profile shapes. For example, the HMD may include a left LCD device having a corner cut profile shape and a right LCD device having a corner cut profile shape. Some embodiments may include a backlight a light guide with adjacent light guide portions of different width that define a corner cut profile shape.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

A LCD device includes an LCD panel and a backlight. The LCD panel includes adjacent panel portions of different width that collectively define a corner cut profile shape for the LCD panel. The backlight includes a light guide and light sources that emit light into the light guide. The backlight directs the light from the light sources toward the LCD panel. The light guide includes adjacent light guide portions of different width that define the corner cut profile shape. Each light guide portion is disposed behind a corresponding LCD panel portion to illuminate the corresponding LCD panel portion. The LCD device can be incorporated into a front rigid body of a head-mounted display (HMD), where the corner cut portion can provide open regions for component or object placement within the front rigid body. For example, the corner cut profile shapes of two adjacent LCD devices, one for the left eye and one for the right eye, may define an open region for placement of other components or parts of the user, such as the user's nose when wearing the HMD. Different light guide portions of the same light guide may include different physical characteristics, such as different width, thickness, extraction feature density, etc. to provide uniform illumination to each the LCD panel portions.

System Overview

Figure 1:
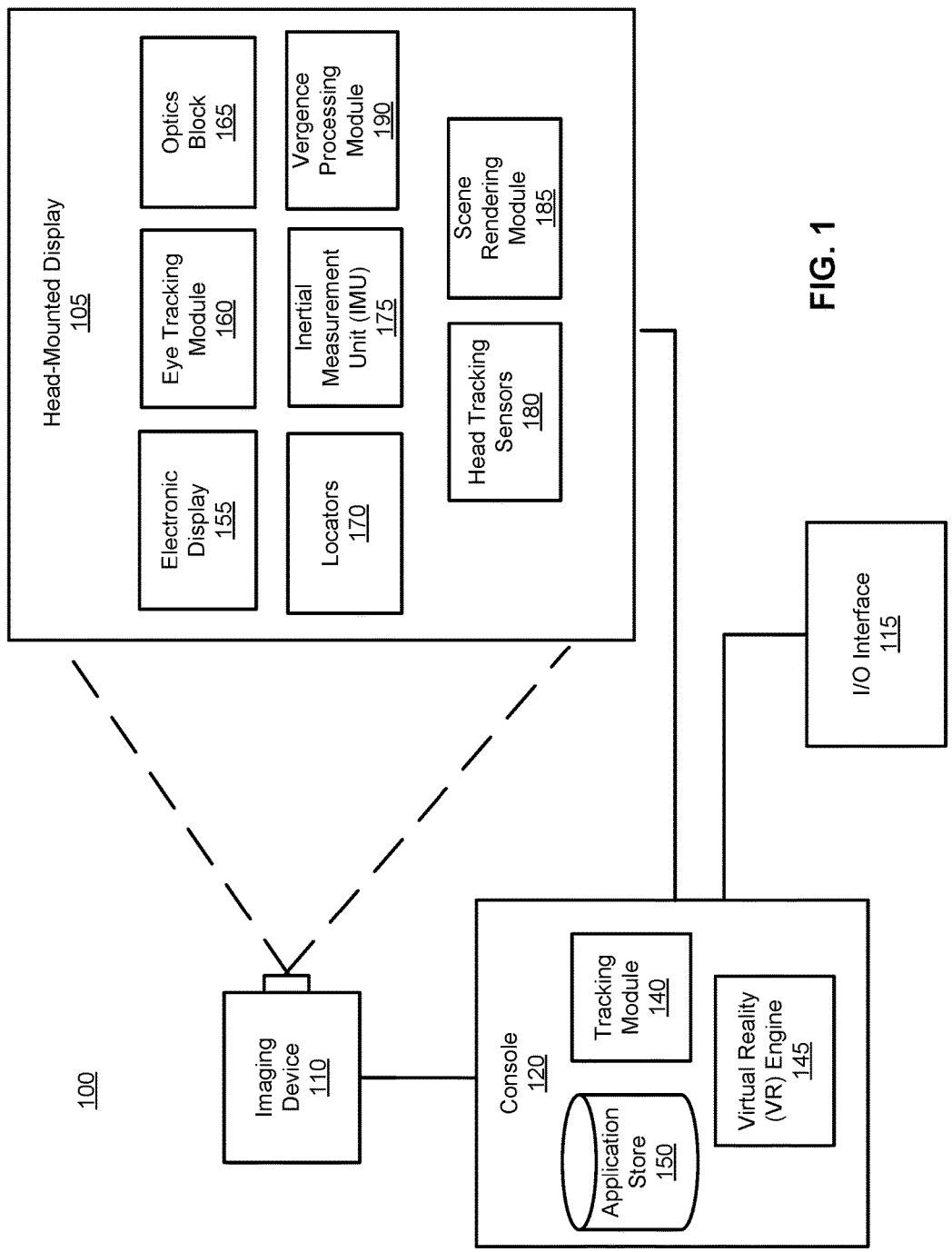
FIG. 1 shows a system, in accordance with some embodiments.

FIG. 1 shows a system 100 including a head-mounted display (HMD), in accordance with some embodiments. The system 100 may be for use as a virtual reality (VR) system, an augmented reality (AR) system, a mixed reality (MR) system, or some combination thereof. In this example, the system 100 includes a HMD 105, an imaging device 110, and an input/output (I/O) interface 115, which are each coupled to a console 120. While FIG. 1 shows a single HMD 105, a single imaging device 110, and an I/O interface 115, in other embodiments, any number of these components may be included in the system. For example, there may be multiple HMDs 105 each having an associated input interface 115 and being monitored by one or more imaging devices 110, with each HMD 105, I/O interface 115, and imaging devices 110 communicating with the console 120. In alternative configurations, different and/or additional components may also be included in the system 100. The HMD 105 may act as a VR, AR, and/or a MR HMD. An MR and/or AR HMD augments views of a physical, real-world environment with computer-generated elements (e.g., images, video, sound, etc.).

The HMD 105 presents content to a user. Example content includes images, video, audio, or some combination thereof. Audio content may be presented via a separate device (e.g., speakers and/or headphones) external to the HMD 105 that receives audio information from the HMD 105, the console 120, or both. The HMD 105 includes an electronic display 155, an eye tracking module 160, an optics block 165, one or more locators 170, an internal measurement unit (IMU) 175, head tracking sensors 180, and a scene rendering module 185, and a vergence processing module 190.

The electronic display 155 is a LCD device including a LCD panel and a backlight. The HMD 105 may include two separate electronic displays, a first electronic display 155 for the user's left eye and a second electronic display 155 for the user's right eye. As discussed in greater detail below with reference to FIGS. 4 through 7, the LCD panel and backlight of each electronic display includes a corner cut shape. The corner cut shape increases available space to place other components within the HMD 105 and/or available space to accommodate the user's nose when wearing the HMD 105.

The optics block 165 adjusts its focal length responsive to instructions from the console 120. In some embodiments, the optics block 165 includes a multi multifocal block to adjust a focal length (adjusts optical power) of the optics block 165.

The eye tracking module 160 tracks an eye position and eye movement of a user of the HMD 105. A camera or other optical sensor inside the HMD 105 captures image information of a user's eyes, and the eye tracking module 160 uses the captured information to determine interpupillary distance, interocular distance, a three-dimensional (3D) position of each eye relative to the HMD 105 (e.g., for distortion adjustment purposes), including a magnitude of torsion and rotation (i.e., roll, pitch, and yaw) and gaze directions for each eye. The information for the position and orientation of the user's eyes is used to determine the gaze point in a virtual scene presented by the HMD 105 where the user is looking.

The vergence processing module 190 determines a vergence depth of a user's gaze based on the gaze point or an estimated intersection of the gaze lines determined by the eye tracking module 160. Vergence is the simultaneous movement or rotation of both eyes in opposite directions to maintain single binocular vision, which is naturally and automatically performed by the human eye. Thus, a location where a user's eyes are verged is where the user is looking and is also typically the location where the user's eyes are focused. For example, the vergence processing module 190 triangulates the gaze lines to estimate a distance or depth from the user associated with intersection of the gaze lines. The depth associated with intersection of the gaze lines can then be used as an approximation for the accommodation distance, which identifies a distance from the user where the user's eyes are directed. Thus, the vergence distance allows determination of a location where the user's eyes should be focused.

The locators 170 are objects located in specific positions on the HMD 105 relative to one another and relative to a specific reference point on the HMD 105. A locator 170 may be a light emitting diode (LED), a corner cube reflector, a reflective marker, a type of light source that contrasts with an environment in which the HMD 805 operates, or some combination thereof. Active locators 170 (i.e., an LED or other type of light emitting device) may emit light in the visible band (~380 nm to 850 nm), in the infrared (IR) band (~850 nm to 1 mm), in the ultraviolet band (10 nm to 380 nm), some other portion of the electromagnetic spectrum, or some combination thereof.

The locators 170 can be located beneath an outer surface of the HMD 105, which is transparent to the wavelengths of light emitted or reflected by the locators 170 or is thin enough not to substantially attenuate the wavelengths of light emitted or reflected by the locators 170. Further, the outer surface or other portions of the HMD 105 can be opaque in the visible band of wavelengths of light. Thus, the locators 170 may emit light in the IR band while under an outer surface of the HMD 105 that is transparent in the IR band but opaque in the visible band.

The IMU 175 is an electronic device that generates fast calibration data based on measurement signals received from one or more of the head tracking sensors 180, which generate one or more measurement signals in response to motion of HMD 105. Examples of the head tracking sensors 180 include accelerometers, gyroscopes, magnetometers, other sensors suitable for detecting motion, correcting error associated with the IMU 175, or some combination thereof. The head tracking sensors 180 may be located external to the IMU 175, internal to the IMU 175, or some combination thereof.

Based on the measurement signals from the head tracking sensors 180, the IMU 175 generates fast calibration data indicating an estimated position of the HMD 105 relative to an initial position of the HMD 105. For example, the head tracking sensors 180 include multiple accelerometers to measure translational motion (forward/back, up/down, left/right) and multiple gyroscopes to measure rotational motion (e.g., pitch, yaw, and roll). The IMU 175 can, for example, rapidly sample the measurement signals and calculate the estimated position of the HMD 105 from the sampled data. For example, the IMU 175 integrates measurement signals received from the accelerometers over time to estimate a velocity vector and integrates the velocity vector over time to determine an estimated position of a reference point on the HMD 105. The reference point is a point that may be used to describe the position of the HMD 105. While the reference point may generally be defined as a point in space, in various embodiments, a reference point is defined as a point within the HMD 105 (e.g., a center of the IMU 175). Alternatively, the IMU 175 provides the sampled measurement signals to the console 120, which determines the fast calibration data.

The IMU 175 can additionally receive one or more calibration parameters from the console 120. As further discussed below, the one or more calibration parameters are used to maintain tracking of the HMD 105. Based on a received calibration parameter, the IMU 175 may adjust one or more of the IMU parameters (e.g., sample rate). In some embodiments, certain calibration parameters cause the IMU 175 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The scene rendering module 185 receives content for the virtual scene from a VR engine 145 and provides the content for display on the electronic display 155. Additionally, the scene rendering module 185 can adjust the content based on information from the IMU 175, the vergence processing module 830, and the head tracking sensors 180. The scene rendering module 185 determines a portion of the content to be displayed on the electronic display 155 based on one or more of the tracking module 140, the head tracking sensors 180, or the IMU 175.

The imaging device 110 generates slow calibration data in accordance with calibration parameters received from the console 120. Slow calibration data includes one or more images showing observed positions of the locators 125 that are detectable by imaging device 110. The imaging device 110 may include one or more cameras, one or more video cameras, other devices capable of capturing images including one or more locators 170, or some combination thereof. Additionally, the imaging device 110 may include one or more filters (e.g., for increasing signal to noise ratio). The imaging device 110 is configured to detect light emitted or reflected from the locators 170 in a field of view of the imaging device 110. In embodiments where the locators 170 include passive elements (e.g., a retroreflector), the imaging device 110 may include a light source that illuminates some or all of the locators 170, which retro-reflect the light towards the light source in the imaging device 110. Slow calibration data is communicated from the imaging device 110 to the console 120, and the imaging device 110 receives one or more calibration parameters from the console 120 to adjust one or more imaging parameters (e.g., focal length, focus, frame rate, ISO, sensor temperature, shutter speed, aperture, etc.).

The I/O interface 115 is a device that allows a user to send action requests to the console 120. An action request is a request to perform a particular action. For example, an action request may be to start or end an application or to perform a particular action within the application. The I/O interface 115 may include one or more input devices. Example input devices include a keyboard, a mouse, a hand-held controller, a glove controller, or any other suitable device for receiving action requests and communicating the received action requests to the console 120. An action request received by the I/O interface 115 is communicated to the console 120, which performs an action corresponding to the action request. In some embodiments, the I/O interface 115 may provide haptic feedback to the user in accordance with instructions received from the console 120. For example, haptic feedback is provided by the I/O interface 115 when an action request is received, or the console 120 communicates instructions to the I/O interface 115 causing the I/O interface 115 to generate haptic feedback when the console 120 performs an action.

The console 120 provides content to the HMD 105 for presentation to the user in accordance with information received from the imaging device 110, the HMD 105, or the I/O interface 115. The console 120 includes an application store 150, a tracking module 140, and the VR engine 145. Some embodiments of the console 120 have different or additional modules than those described in conjunction with FIG. 1. Similarly, the functions further described below may be distributed among components of the console 120 in a different manner than is described here.

The application store 150 stores one or more applications for execution by the console 120. An application is a group of instructions, that when executed by a processor, generates content for presentation to the user. Content generated by an application may be in response to inputs received from the user via movement of the HMD 105 or the I/O interface 115. Examples of applications include gaming applications, conferencing applications, video playback application, or other suitable applications.

The tracking module 140 calibrates the system 100 using one or more calibration parameters and may adjust one or more calibration parameters to reduce error in determining position of the HMD 105. For example, the tracking module 140 adjusts the focus of the imaging device 110 to obtain a more accurate position for observed locators 170 on the HMD 105. Moreover, calibration performed by the tracking module 140 also accounts for information received from the IMU 175. Additionally, if tracking of the HMD 105 is lost (e.g., imaging device 110 loses line of sight of at least a threshold number of locators 170), the tracking module 140 re-calibrates some or all of the system 100 components.

Additionally, the tracking module 140 tracks the movement of the HMD 105 using slow calibration information from the imaging device 110 and determines positions of a reference point on the HMD 105 using observed locators from the slow calibration information and a model of the HMD 105. The tracking module 140 also determines positions of the reference point on the HMD 105 using position information from the fast calibration information from the IMU 175 on the HMD 105. Additionally, the tracking module 160 may use portions of the fast calibration information, the slow calibration information, or some combination thereof, to predict a future location of the HMD 105, which is provided to the VR engine 145.

The VR engine 145 executes applications within the system 100 and receives position information, acceleration information, velocity information, predicted future positions, or some combination thereof for the HMD 105 from the tracking module 140. Based on the received information, the VR engine 145 determines content to provide to the HMD 105 for presentation to the user, such as a virtual scene, one or more virtual objects to overlay onto a real world scene, etc.

In some embodiments, the VR engine 145 maintains focal capability information of the optics block 165. Focal capability information is information that describes what focal distances are available to the optics block 165. Focal capability information may include, e.g., a range of focus the optics block 165 is able to accommodate (e.g., 0 to 4 diopters), a resolution of focus (e.g., 0.25 diopters), a number of focal planes, combinations of settings for switchable half wave plates (SHWPs) (e.g., active or non-active) that map to particular focal planes, combinations of settings for SHWPS and active liquid crystal lenses that map to particular focal planes, or some combination thereof.

The VR engine 145 generates instructions for the optics block 165, the instructions causing the optics block 165 to adjust its focal distance to a particular location. The VR engine 145 generates the instructions based on focal capability information and, e.g., information from the vergence processing module 190, the IMU 175, and the head tracking sensors 180. The VR engine 145 uses the information from the vergence processing module 190, the IMU 175, and the head tracking sensors 180, or some combination thereof, to select an ideal focal plane to present content to the user. The VR engine 145 then uses the focal capability information to select a focal plane that is closest to the ideal focal plane. The VR engine 145 uses the focal information to determine settings for one or more SHWPs, one or more active liquid crystal lenses, or some combination thereof, within the optics block 176 that are associated with the selected focal plane. The VR engine 145 generates instructions based on the determined settings, and provides the instructions to the optics block 165.

The VR engine 145 performs an action within an application executing on the console 120 in response to an action request received from the I/O interface 115 and provides feedback to the user that the action was performed. The provided feedback may be visual or audible feedback via the HMD 105 or haptic feedback via the I/O interface 115.

Figure 2:
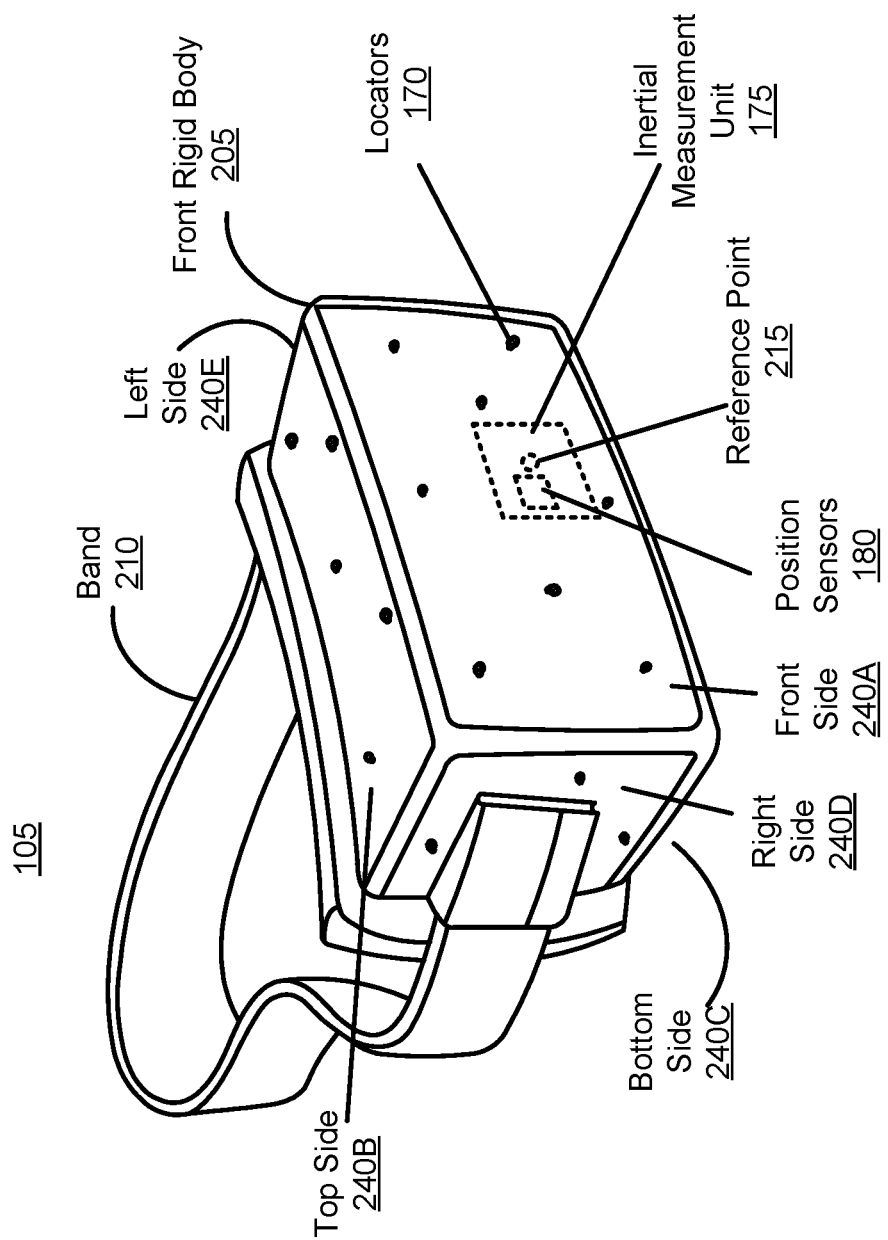
FIG. 2 shows a head-mounted display (HMD), in accordance with some embodiments.

FIG. 2 shows a head-mounted display (HMD) 105, in accordance with some embodiments. The HMD 105 includes a front rigid body 205 and a band 210. The front rigid body 205 includes an electronic display (not shown), an inertial measurement unit (IMU) 175, one or more position sensors 180, and locators 170. In some embodiments, a user movement is detected by use of the inertial measurement unit 175, position sensors 180, and/or the locators 170, and an image is presented to a user through the electronic display according to the user movement detected. In some embodiments, the HMD 105 can be used for presenting a virtual reality, an augmented reality, or a mixed reality to a user.

A position sensor 180 generates one or more measurement signals in response to motion of the HMD 105. Examples of position sensors 180 include: one or more accelerometers, one or more gyroscopes, one or more magnetometers, another suitable type of sensor that detects motion, a type of sensor used for error correction of the IMU 175, or some combination thereof. The position sensors 180 may be located external to the IMU 175, internal to the IMU 175, or some combination thereof. In FIG. 2, the position sensors 180 are located within the IMU 175, and neither the IMU 175 nor the position sensors 180 are visible to the user.

Based on the one or more measurement signals from one or more position sensors 180, the IMU 175 generates calibration data indicating an estimated position of the HMD 105 relative to an initial position of the HMD 105. In some embodiments, the IMU 175 rapidly samples the measurement signals and calculates the estimated position of the HMD 100 from the sampled data. For example, the IMU 175 integrates the measurement signals received from the accelerometers over time to estimate a velocity vector and integrates the velocity vector over time to determine an estimated position of a reference point on the HMD 105. Alternatively, the IMU 175 provides the sampled measurement signals to a console (e.g., a computer), which determines the calibration data. The reference point is a point that may be used to describe the position of the HMD 105. While the reference point may generally be defined as a point in space; however, in practice the reference point is defined as a point within the HMD 105 (e.g., a center of the IMU 175).

The locators 180 are located in fixed positions on the front rigid body 205 relative to one another and relative to a reference point 215. In FIG. 2, the reference point 215 is located at the center of the IMU 175. Each of the locators 170 emits light that is detectable by an imaging device (e.g., camera or an image sensor). Locators 170, or portions of locators 170, are located on a front side 240A, a top side 240B, a bottom side 240C, a right side 240D, and a left side 240E of the front rigid body 205 in the example of FIG. 2.

Figure 3:
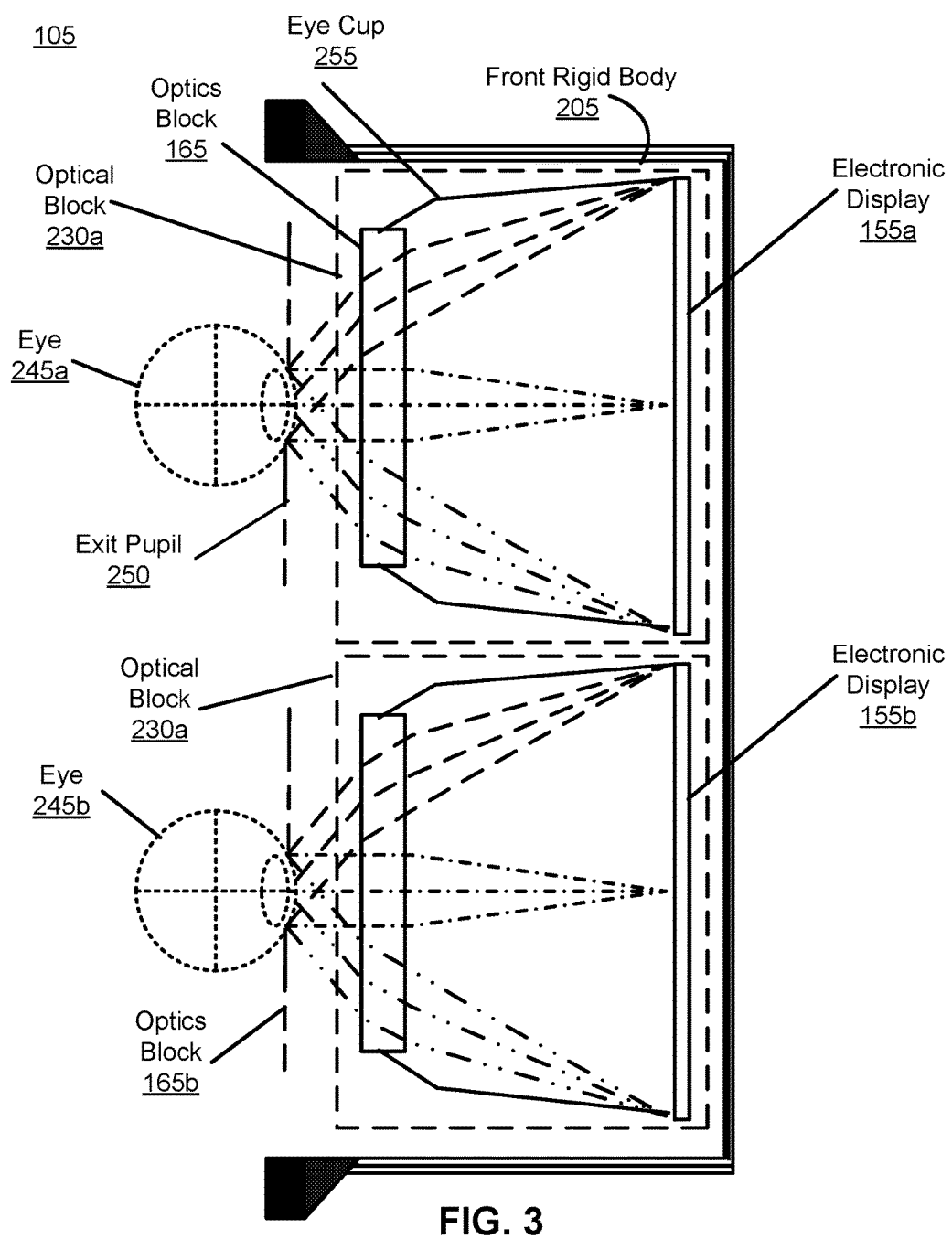
FIG. 3 shows a cross section of a front rigid body of the HMD in FIG. 2, in accordance with some embodiments

FIG. 3 shows a cross section of the front rigid body 205 of the HMD 105 shown in FIG. 2. The front rigid body 205 includes an optical block 230a and an optical block 230b. The optical block 230a includes an electronic display 155a to provide images for a first eye 245a of the user. The optical block 230b includes an electronic display 155b to provide images for a second eye 245b of the user. The optical block 230a will now be discussed in greater detail with the discussion being applicable to the optical block 230b.

The optical block 230a provides altered image light to an exit pupil 250. The exit pupil 250 is the location in the front rigid body 205 where the user's eye 245a is positioned. The optical block 230a includes the electronic display 155a, an optics block 165, and an eye cup 255. The eye cup 255 is mechanically secured with the front rigid body 205, and holds the optics block 165. The electronic display 155a emits image light toward the optics block 165. The optics block 165 magnifies the image light, and in some embodiments, also corrects for one or more additional optical errors (e.g., distortion, astigmatism, etc.). The optics block 165 directs the image light to the exit pupil 250 for presentation to the user. In some embodiments, the optics block 165 and the eye cone 255 may be omitted from the optical block 230.

When the user wears the HMD 105, the user's noise is positioned between the two optical blocks 230a and 230b. The electronic displays 155a and 155b may each be corner cut displays (e.g., rather than rectangular) to provide space for other components, as well as space for the user's noise between the electronic displays 155a and 155b. Furthermore, corner cut electronic displays are advantageous for the HMD 105 because the optics block 165, including optical elements such as lenses, can create distortion at the wide field angles. As such, utilization of rectangular display corners may be undesirable for HMDs.

Figure 4:
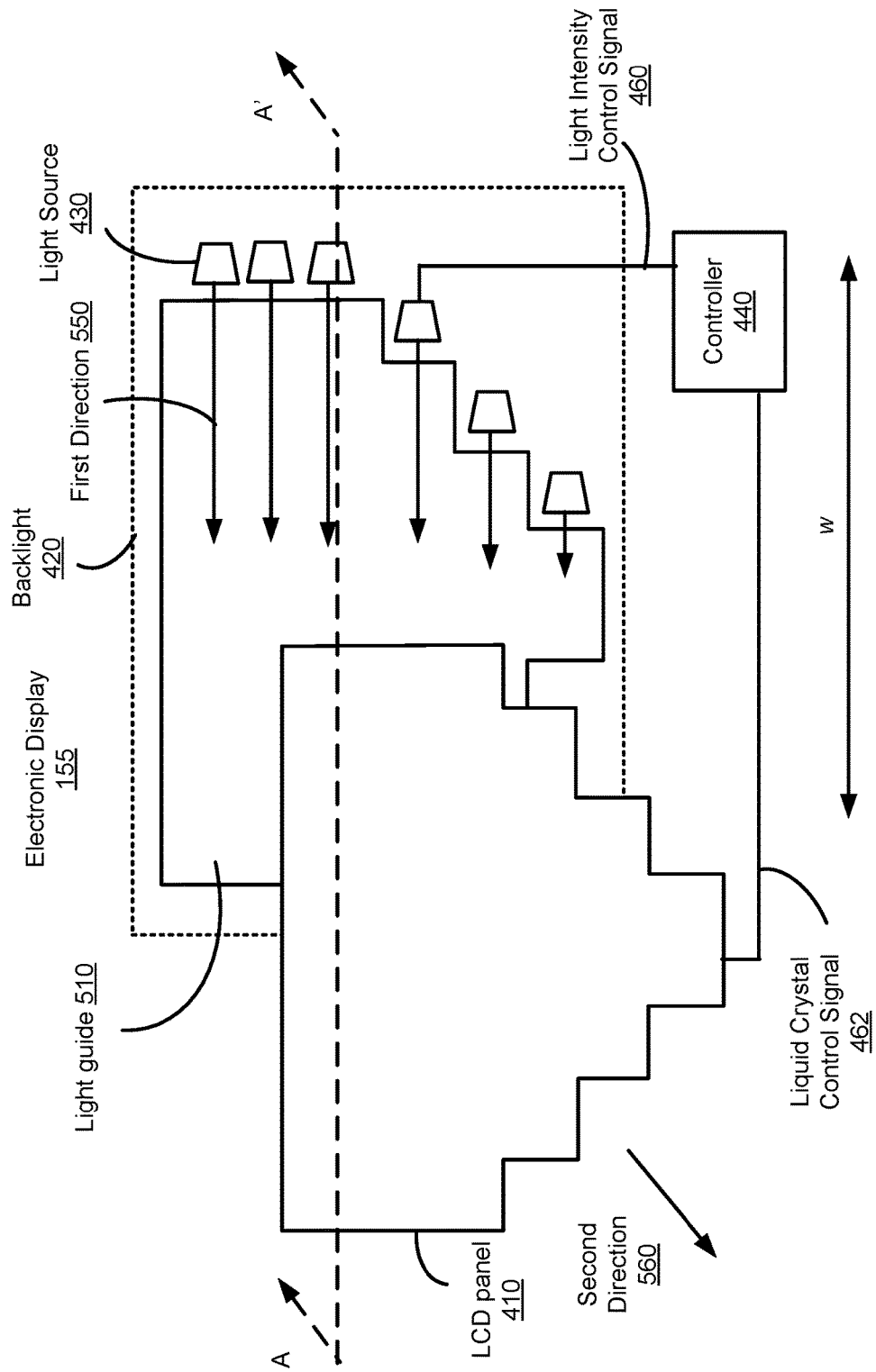
FIG. 4 shows an exploded view of an example electronic display, in accordance with some embodiments.

FIG. 4 shows an exploded view of an example electronic display 155, in accordance with some embodiments. The electronic display 155 is a corner cut display including a corner cut LCD panel 410 (also referred to as "LCD panel 410"), a corner cut backlight 420 (also referred to as "backlight 420"), and a controller 440.

The LCD panel 410 and backlight 420 include "corner cut" profile shapes because they have a rectangular profile shape with one or more corners missing from the rectangular shape, as shown in FIG. 4. The LCD panel 410 includes a liquid crystal layer. The liquid crystal layer may be fabricated with the corner cut profile shape, or may be fabricated as a rectangular shaped layer with the one or more corner regions subsequently cut out from the rectangular shaped layer. In FIG. 4, the bottom left and bottom right corner regions of the LCD panel 4 are cut out regions to define a corner cut profile shape for the LCD panel 410.

The corner cut backlight 420 includes a corner cut light guide 510 and light sources 430. The corner cut light guide 510 includes a plurality of light guide portions having different widths along the dimension w. Similarly, the LCD panel 410 also includes a plurality of panel portions having different widths along the dimension w. The controller 440 controls the setting of liquid crystals of the LCD panel 410 by providing a liquid crystal control signal 462 to the LCD panel 410. The controller 440 also controls the switching on and off of the light sources 430 by providing a light intensity control signal 460. The controller 440 coordinates the timing of selective LC setting and light source activation.

The light sources 430, which may be an array of LEDs arranged along a side surface of the light guide 510, emit light in a first direction 550 into the light guide 510. The light guide 510 directs the light propagating in the first direction 550 in a second direction 560 toward the LCD panel 410 to illuminate the pixels of the liquid crystal layer.

Figure 5:
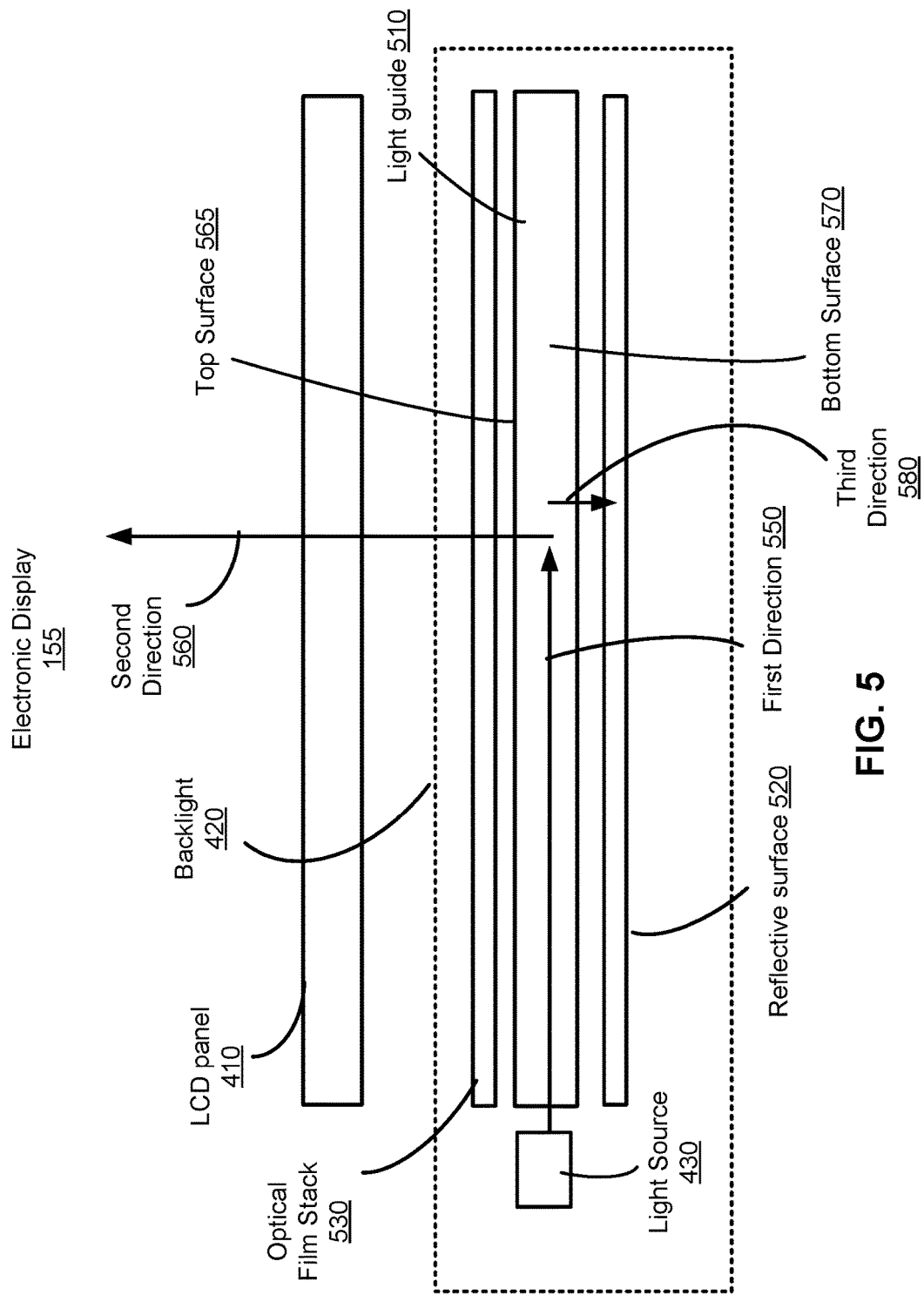
FIG. 5 shows a cross sectional side view of the electronic display shown in FIG. 4, in accordance with some embodiments.

FIG. 5 shows a cross sectional side view of the electronic display 155, in accordance with some embodiments. The cross sectional view is taken along the line A-A' shown in FIG. 4. The backlight 420 further includes a reflective surface 520 and an optical film stack 530. The optical film stack 530 may be disposed between the light guide 510 and the LCD panel 410. The optical film stack 530 may include a diffuser that facilitates the uniform distribution of light from the light guide 510 across the pixels of the LCD panel 410. The optical film stack 530 may additionally or alternatively include a reflective polarizer film that reflects unpolarized light back toward the LCD panel 410 that would otherwise be absorbed. The optical film stack 530 may also include brightness enhancement films (BEFs) (not shown) that control the intensity as a function of angle and recycle light through the system.

The light guide 510 directs light emitted from the light source 430 in the first direction 550 towards the top surface 565 in the second direction 560 and the bottom surface 570 of the light guide 510 in a third direction 580, where the top surface 565 faces the LCD panel 410 and the bottom surface 570 faces the reflective surface 520. The reflective surface 520 includes an optical mirror that reflects light directed from the bottom surface 570 of the light guide 510 in the third direction 580 towards the LCD panel 410 in the second direction 560. In some embodiments, the reflective surface 520 and optical film stack 530 also include a corner cut profile shape that conforms with the shape of the LCD panel 410 and light guide 510.

Figure 6:
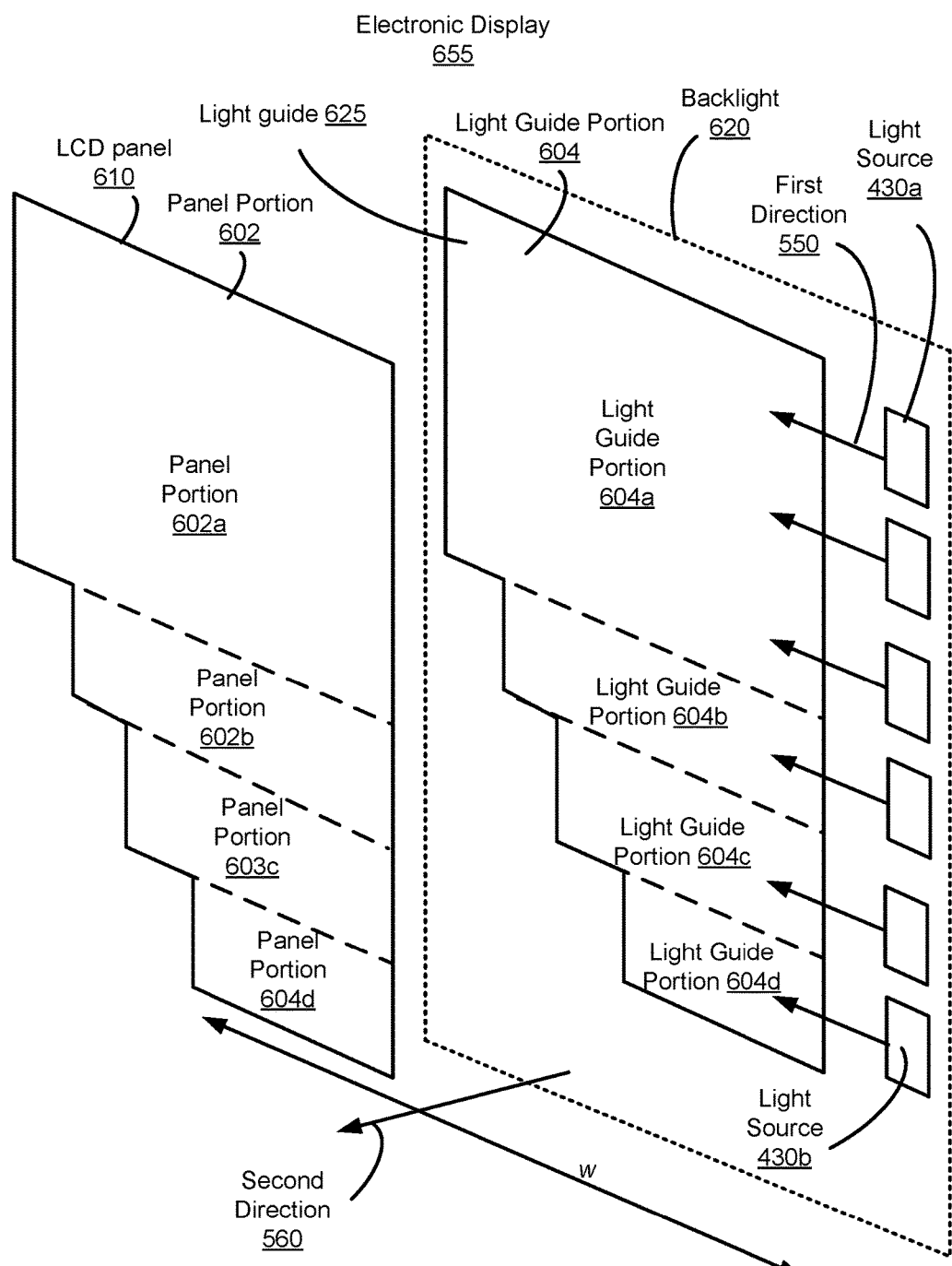
FIG. 6 shows a corner cut LCD panel and a corner cut backlight of an electronic display, in accordance with some embodiments.

FIG. 6 shows an alignment of a corner cut LCD panel 610 and a corner cut backlight 620 of an electronic display 655, in accordance with some embodiments. The electronic display 655 is an example embodiment of an electronic display 155 that can be incorporated into the HMD 105. The LCD panel 610 includes a plurality of adjacent panel portions 602, such as panel portions 602a through 602d. The panel portions 602a through 602d have different widths along the dimension w. The backlight 620 includes a light guide 625 including a plurality of adjacent light guide portions 604, such as light guide portions 604a through 604d. Light guide portions 604a through 604d can also have different widths along the dimension w. The arrangement of the adjacent light guide portions 604 and the adjacent panel portions 602 having different widths along the dimension w define a corner cut profile shape for the electronic display 155 at one or more corners (e.g., top left, top right, bottom left, and/or bottom right). In FIG. 6, the electronic display 655 defines a corner cut portion at the bottom left corner. In FIG. 4, the electronic display 155 includes a a corner cut portion at each of the bottom left and bottom right corners.

Each light guide portion 604 is disposed behind a respective panel portion 602 such that each light guide portion 604 provides light in the second direction 560 to a respective panel portion 602, and thus illuminates the pixels of the respective panel portion 602. For example, the light guide portion 604a illuminates the panel portion 602a, the light guide portion 604b illuminates the panel portion 602b, and so forth for each pair of corresponding panel portion 602 and light guide portion 604. Corresponding panel portions 602 and light guide portions 604 also may share the same or substantially the same width such that the entire LCD panel 610 can be illuminated by a backlight 620 having a corresponding corner cut profile shape with the LCD panel 610. Although the light guide 610 in FIG. 6 includes four light guide portions 604, in other examples, the light guide 610 can include a different number of light guide portions 604 that each illuminates a panel portion 602.

In some embodiments, different light guide portions 604 of the light guide 625 can be fabricated as separate light guide panels, and then combined to form the light guide 625. Each light guide portion 604 may be a single piece component, such as a Poly(methyl methacrylate) (PMMA) panel.

In some embodiments, each light guide portion 604 is separated by air gaps or dielectric material to reduce light leakage across adjacent light guide portions 604. Here, the electronic display 655 may be operated as a segmented backlight with different light guide portions 604 illuminating different panel portions 602 at different times. The controller 440 may provide different light intensity control signals 460 to light sources 430 that emit light into panel portions 602 of different width along the dimension w.

In some embodiments, the light intensity control signals 460 drive the light sources 430 that emit light into panel portions 602 having different widths along the dimension w at different intensities. The different intensities of the light sources 430 allow the light guide portions 604 to provide a uniform brightness of light across the pixels of the panel portions 602 of the LCD panel 610 in a manner that compensates for the width variances of the panel portions 602. For example, the light source 430a for the light guide portion 604a having a larger width along the dimension w may be driven with a larger current than the light source 430b for the light guide portion 604d having a smaller width along the dimension w. In some embodiments, the light guide portions 604 of the light guide 625 are formed from a single piece light guide panel (e.g., having a rectangular profile shape), with portions of the panel removed to define the corner cut profile shape for the light guide 625.

Figure 7A:
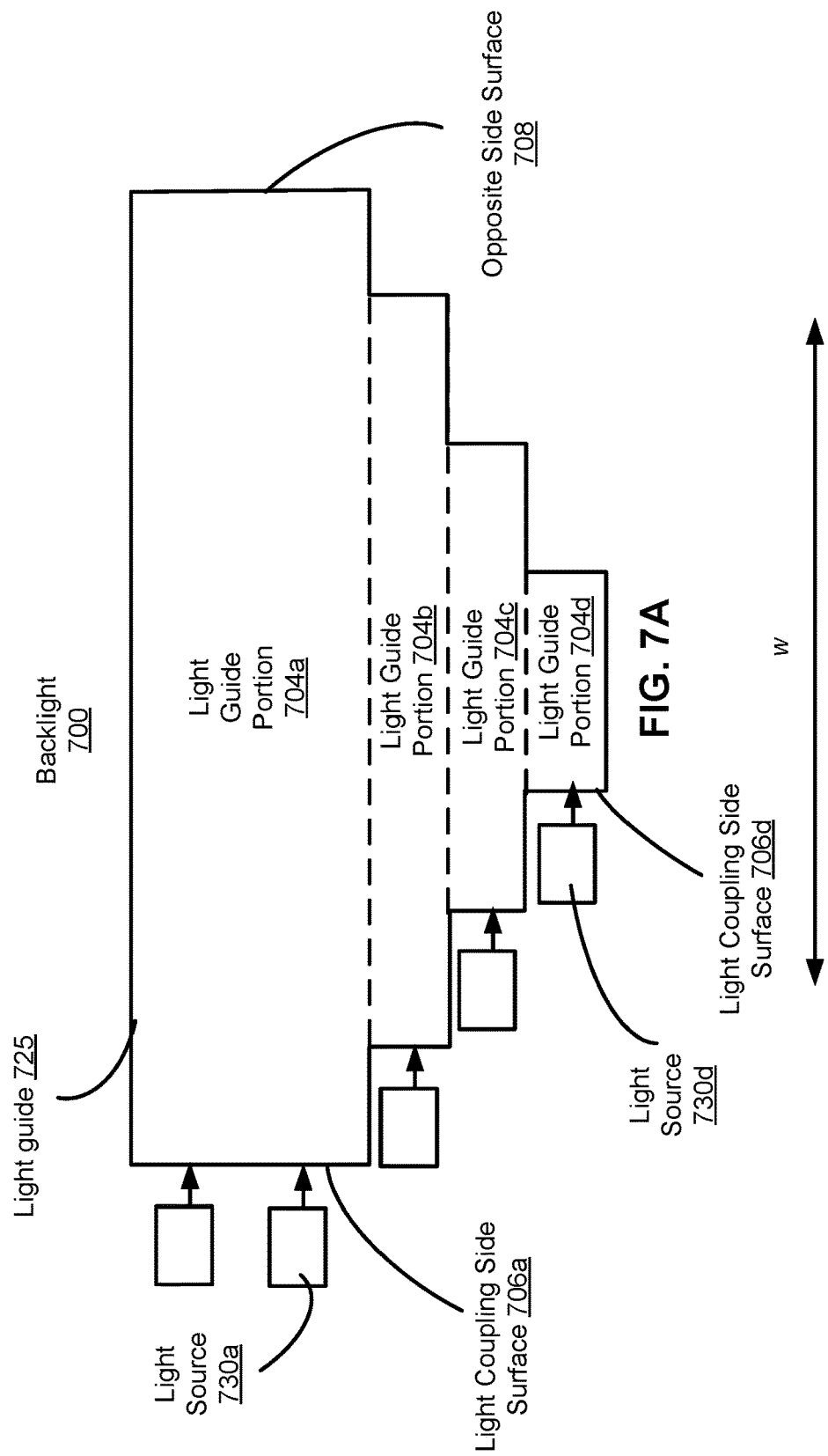
FIGS. 7A, 7B, 8A, 8B, 9A, and 9B show corner cut backlights, in accordance with some embodiments.
Figure 7B:
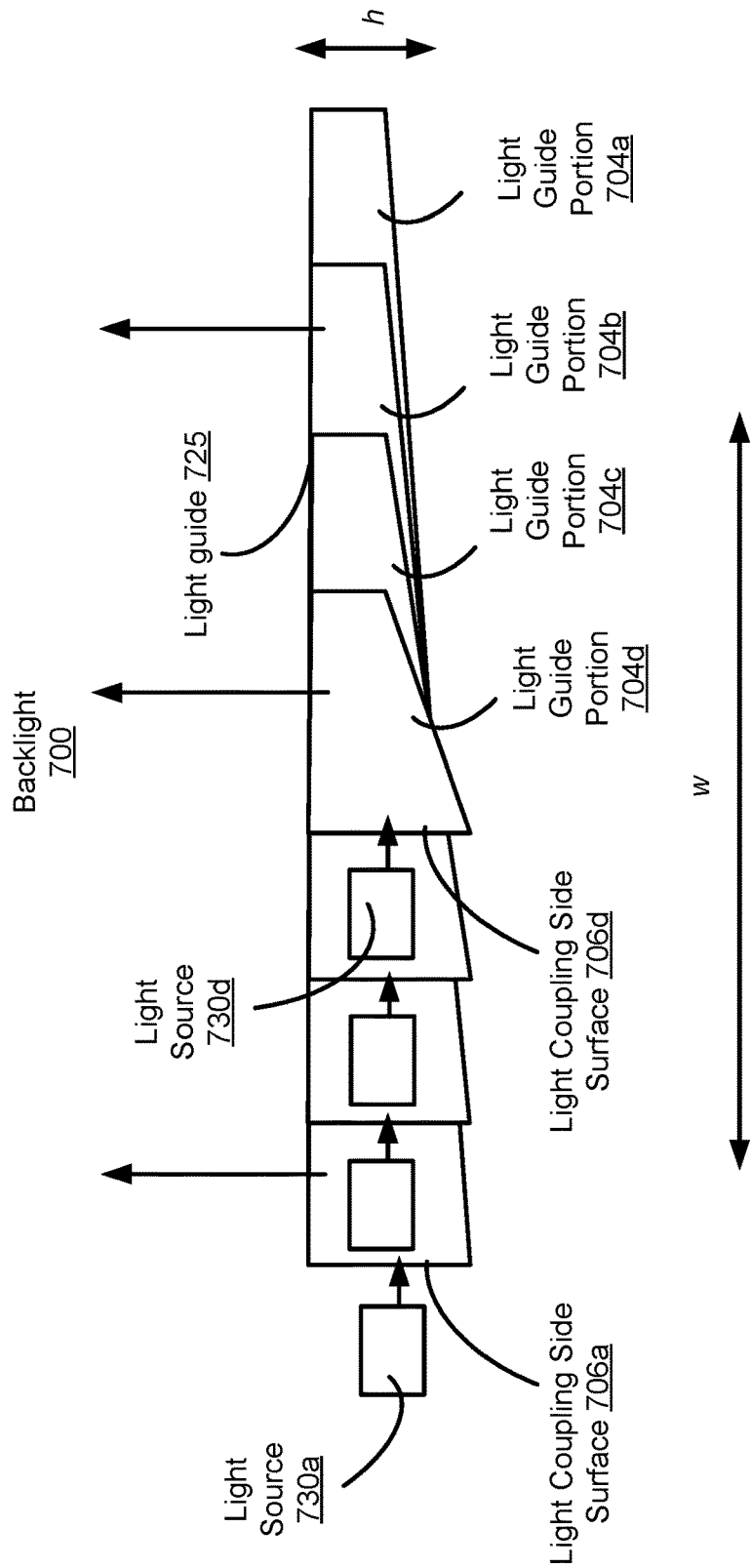

FIGS. 7A and 7B respectively show top and side views of a backlight 700, in accordance with some embodiments. The backlight 700 includes a light guide 725 and an array of light sources 730 disposed along misaligned light coupling side surfaces 706 of the light guide 725. The light guide 725 includes light guide portions 704a through 704d. One or more light sources 730 emit light into each of the light guide portions 704a through 704b. The light sources 730 are arranged along light coupling side surfaces 706 of the light guide portions 704a through 704b. For example, the light source 730a emits light into the light coupling side surface 706a and the light source 730d emits light into the light coupling side surface 706d. At least some of the light guide portions 704 have different widths along the width dimension w, as discussed above.

With reference to FIG. 7B, the light guide portions 704 may include variable thicknesses in the height dimension h along the width dimension w. The thickness in the height dimension h may decrease from the light coupling side surface 706 to the opposite side surface 708 to enhance light extraction uniformity along the width dimension w. In some embodiments, light guide portions 704 having different widths along the width dimension w include variable thicknesses change along the width dimension w to enhance light extraction uniformity along the width dimension w. The variable thicknesses can change more gradually for light guide portions of larger width. For example, a first variable thickness of the light guide portion 704a, having a larger width than the light guide portion 704d, decreases more gradually along the width dimension w than a second variable thickness of the light guide portion 704d along the width dimension w.

Each light source 730 emits light into a light coupling side surface 706 of a light guide portion 704, with light guide coupling side surfaces 706 of panel portions 704 having different widths being misaligned with respect each other along the width dimension w to form the corner cut profile shape. To provide a consistent and reliable optical coupling between each of the light sources 730 and respective panel portions 704, the light sources 730 may be disposed along the misaligned coupling side surfaces 706 at a uniform distance to the misaligned coupling side surfaces 706. For example, the light sources 730a may be the same distance from the side coupling side surface 706b of the light guide portion 704a as the light source 730d from the light coupling side surface 706d of the light guide portion 704d. As such, one or more of the light sources 730 of the backlight 700 may be misaligned with respect to each other along the width dimension w.

Figure 8A:
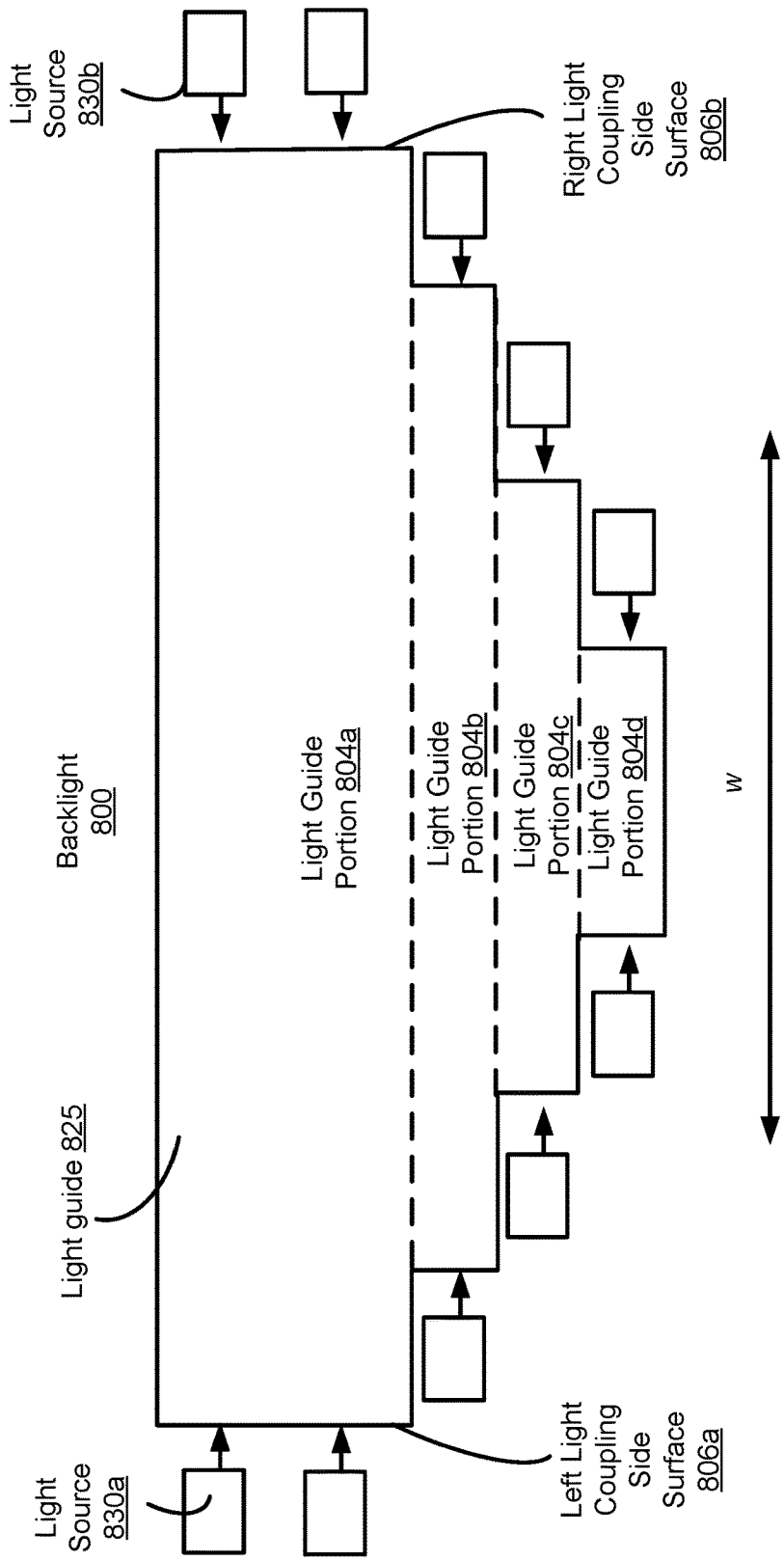
Figure 8B:
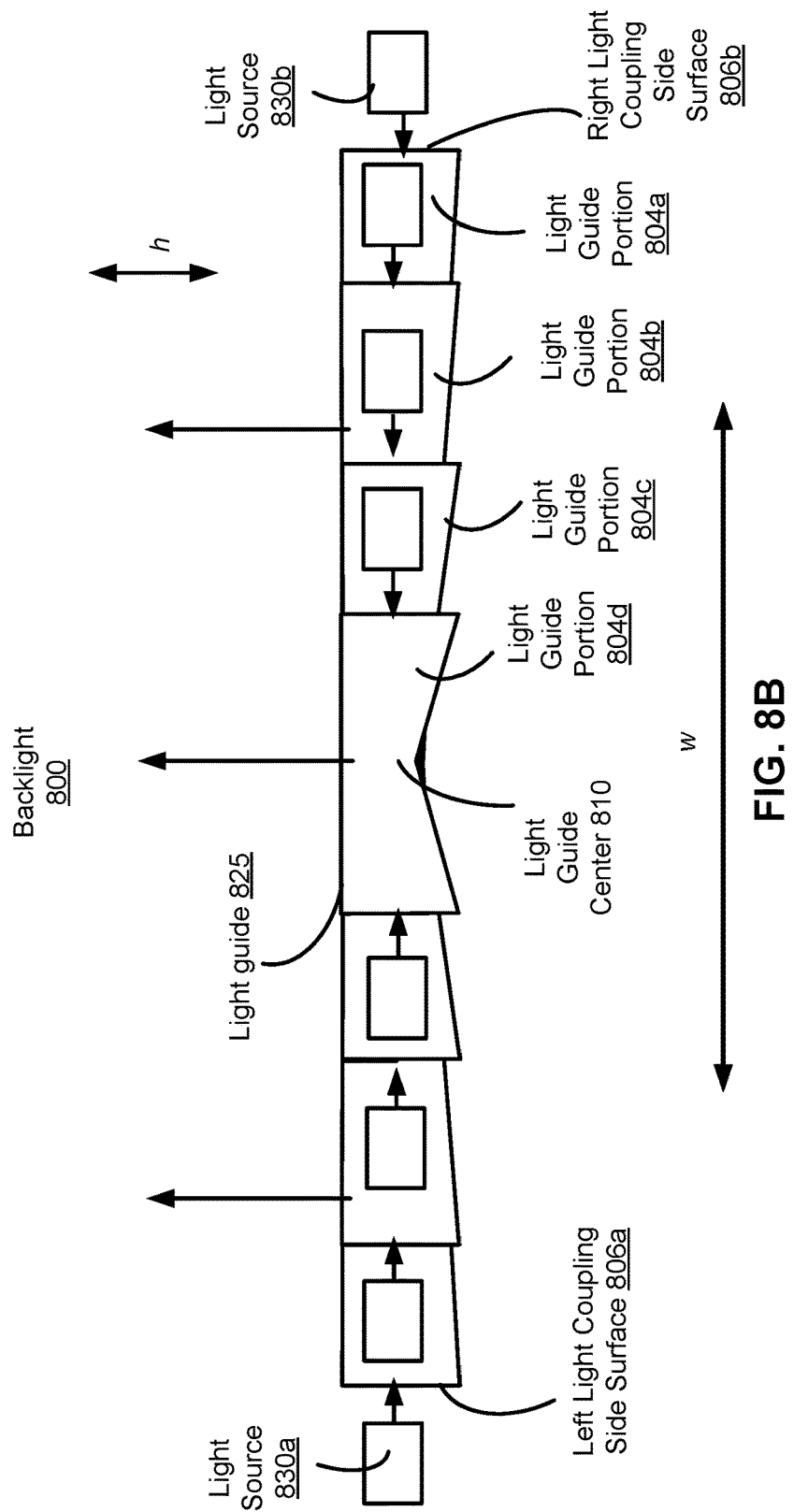

FIGS. 8A and 8B respectively show top and side views of a backlight 800, in accordance with some embodiments. The backlight 800 includes a light guide 825 and multiple arrays of light sources are arranged along opposite light coupling side surfaces. For example, the light sources include a light source 830a arranged along left light coupling side surface 806a of the light guide 825, and a light source 830b arranged along right light coupling surface 806b of the light guide 825.

With reference to FIG. 8B, the light guide portions 804 may include variable thicknesses in the height dimension h along the width dimension w. For example, the thickness in the height dimension h may decrease from the left light coupling side surface 806a to the light guide center 810, and may decrease from the right light coupling side surface 806b to the light guide center 810 to enhance light extraction uniformity along the width dimension w of the light guide portion 804a. The other light guide portions may include similar height variance along their width dimensions w. In some embodiments, light guide portions 804 having different widths along the width dimension w include variable thicknesses change along the width dimension w to enhance light extraction uniformity along the width dimension w. The light guide portions 804 decrease in thickness from the side coupling surfaces to the light guide center 810, with the variable thicknesses changing more gradually for light guide portions of larger width.

Figure 9A:
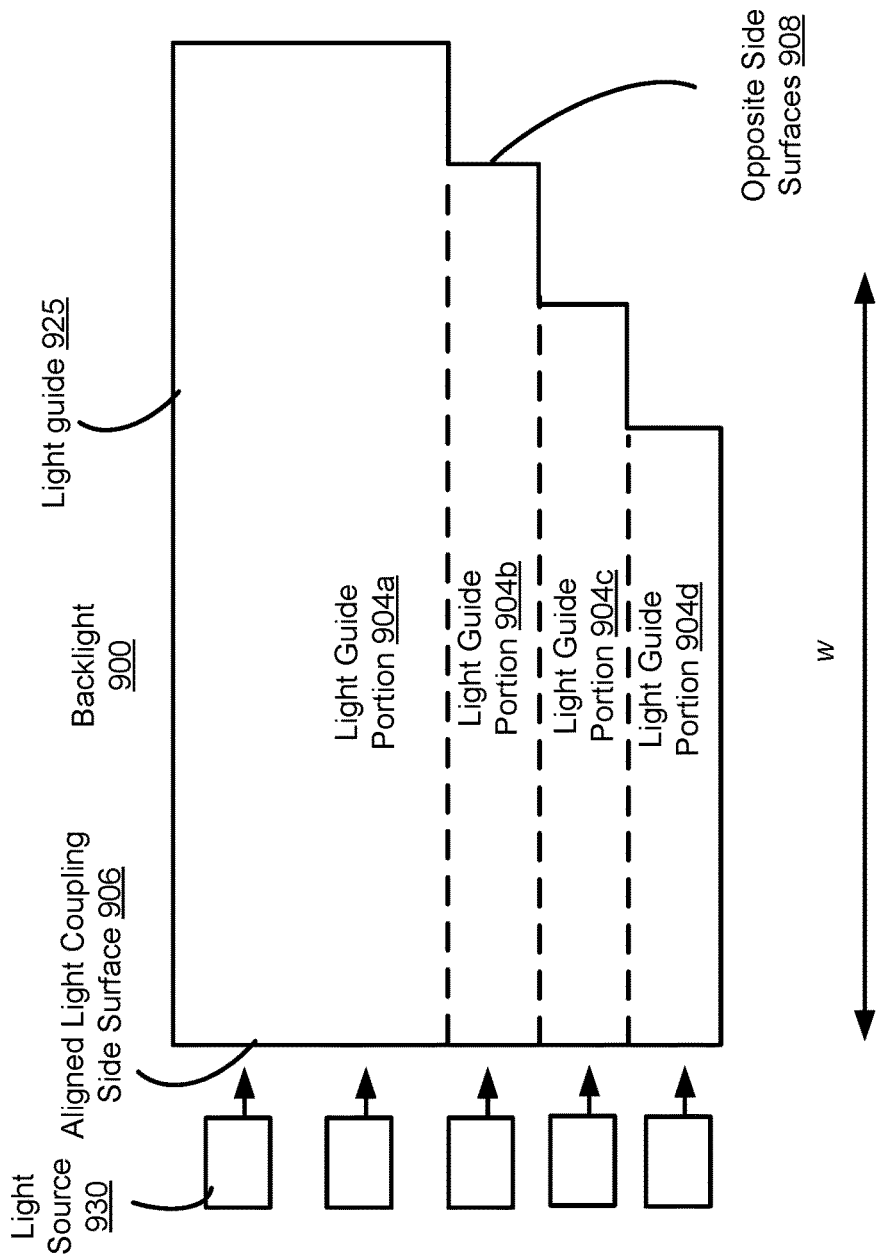
Figure 9B:
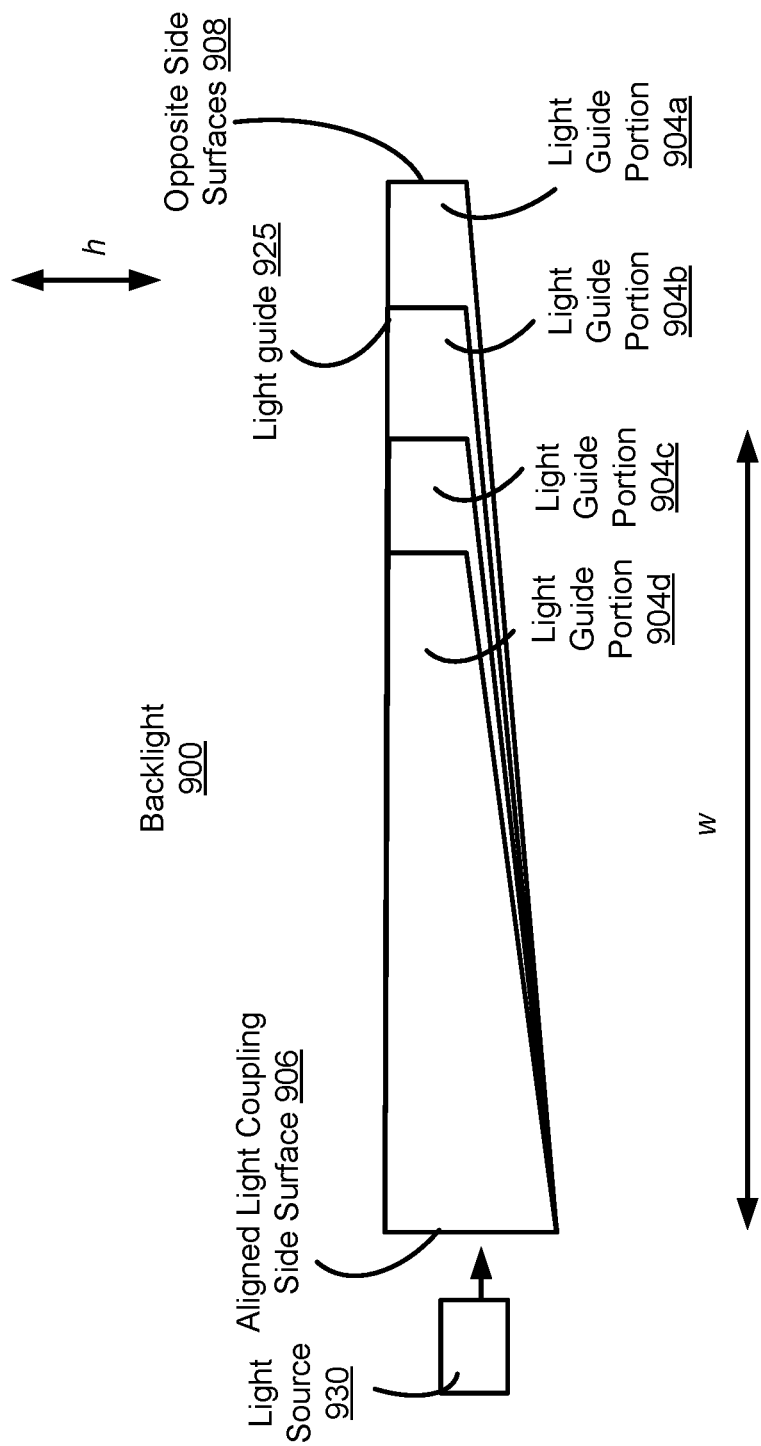

FIGS. 9A and 9B respectively show top and side views of a backlight 900, in accordance with some embodiments. The backlight 900 includes a light guide 925 and an array of light sources 930 disposed along aligned light coupling side surfaces 906 of the light guide 925. The light guide 925 includes adjacent light guide portions 904a through 904d having different width along the dimension w, with the opposite side surface 908 of the adjacent light guide portions 904a through 904d defining corner cut portions of the light guide 925. With reference to FIG. 9B, each light guide portion 904a through 904d may include decreasing thickness in the height dimension h from the aligned light coupling side surface 906 to the opposite side surface 908. Furthermore, light guide portions 904 having smaller size along the width dimension w may include more gradual thickness decrease along the width dimension w.

Figure 10:
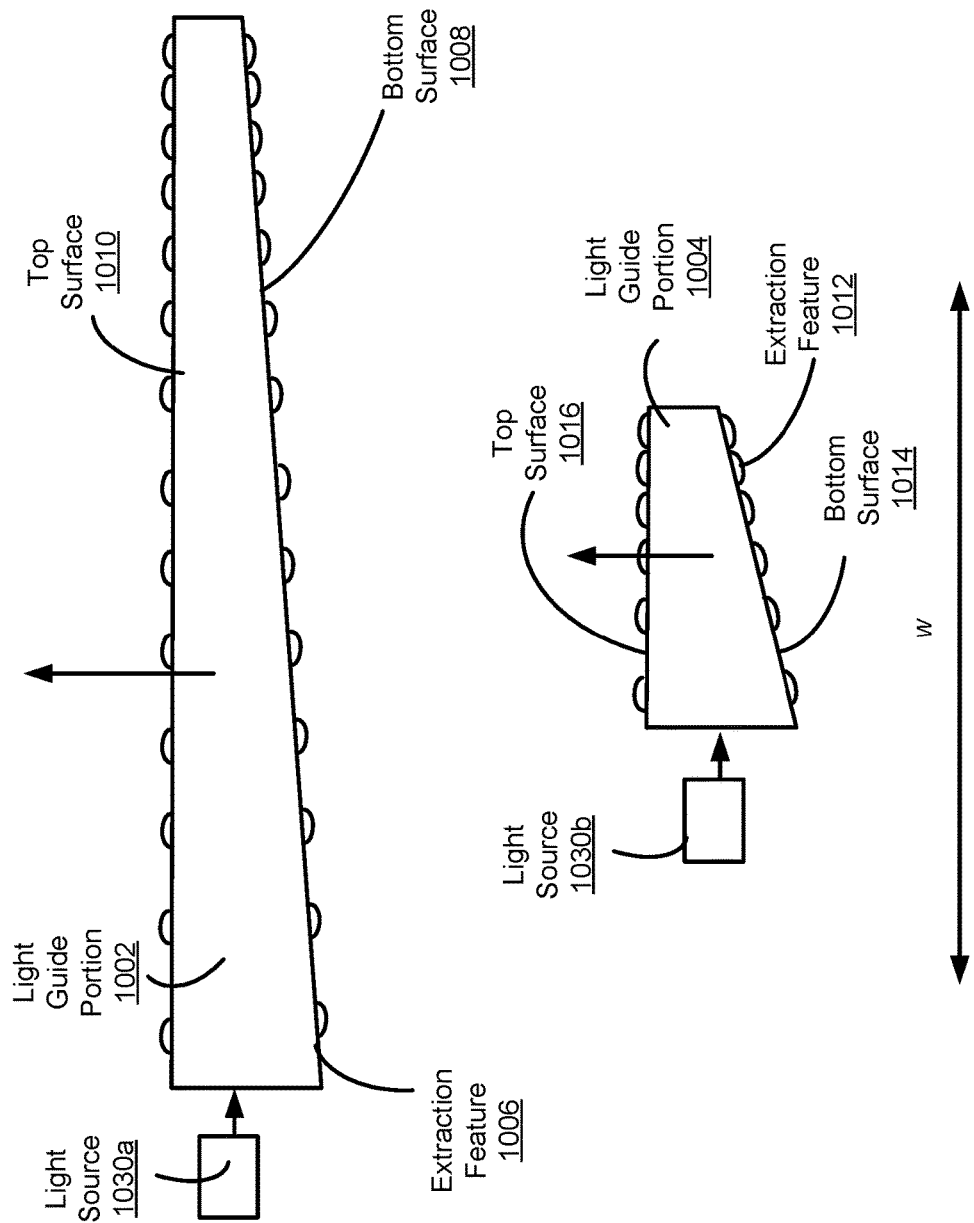
FIG. 10 shows light guide portions of a light guide including extraction features, in accordance with some embodiments.

FIG. 10 shows light guide portions 1002 and 1004 including extraction features, in accordance with some embodiments. Light guide portions 1002 and 1004 may be two portions of a light guide, with the light guide portion 1002 having a larger size along the width dimension w than the light guide portion 1004. The light guide portion 1002 includes extraction features 1006 arranged along a bottom surface 1008 (e.g., facing a reflective surface 520) and along the top surface 1010 (e.g., facing the LCD panel 410). In various embodiments, extraction features can be located on the top surface, bottom surface, or both the top and bottom surface of a light guide portion. The extraction features 1006 include a structure having a series of unevenly spaced bumps that diffuse propagating light. The density of the bumps increase with distance to the light source 1030a according to a diffusion equation.

The light guide portion 1004 includes extraction features 1012 arranged along a bottom surface 1014 and along the top surface 1016. The extraction features 1012 also include a structure having a series of unevenly spaced bumps that diffuse propagating light. The density of the bumps increases with distance to the light source 1030b according to a diffusion equation.

A light guide that includes light guide portions 1002 and 1004 may include extraction features 1006 having a first variable density along the width of the light guide portion 1002, and second extraction features 1012 having a second variable density along the width of the light guide portion 1004. In some embodiments, light guide portions having larger size along the width dimension w may include less gradual increase in extraction feature density along the width dimension w. For example, the first variable density of the light extraction features 1006 increases along the width dimension w less gradually than the second variable density of the light extraction features 1012.

Figure 11:
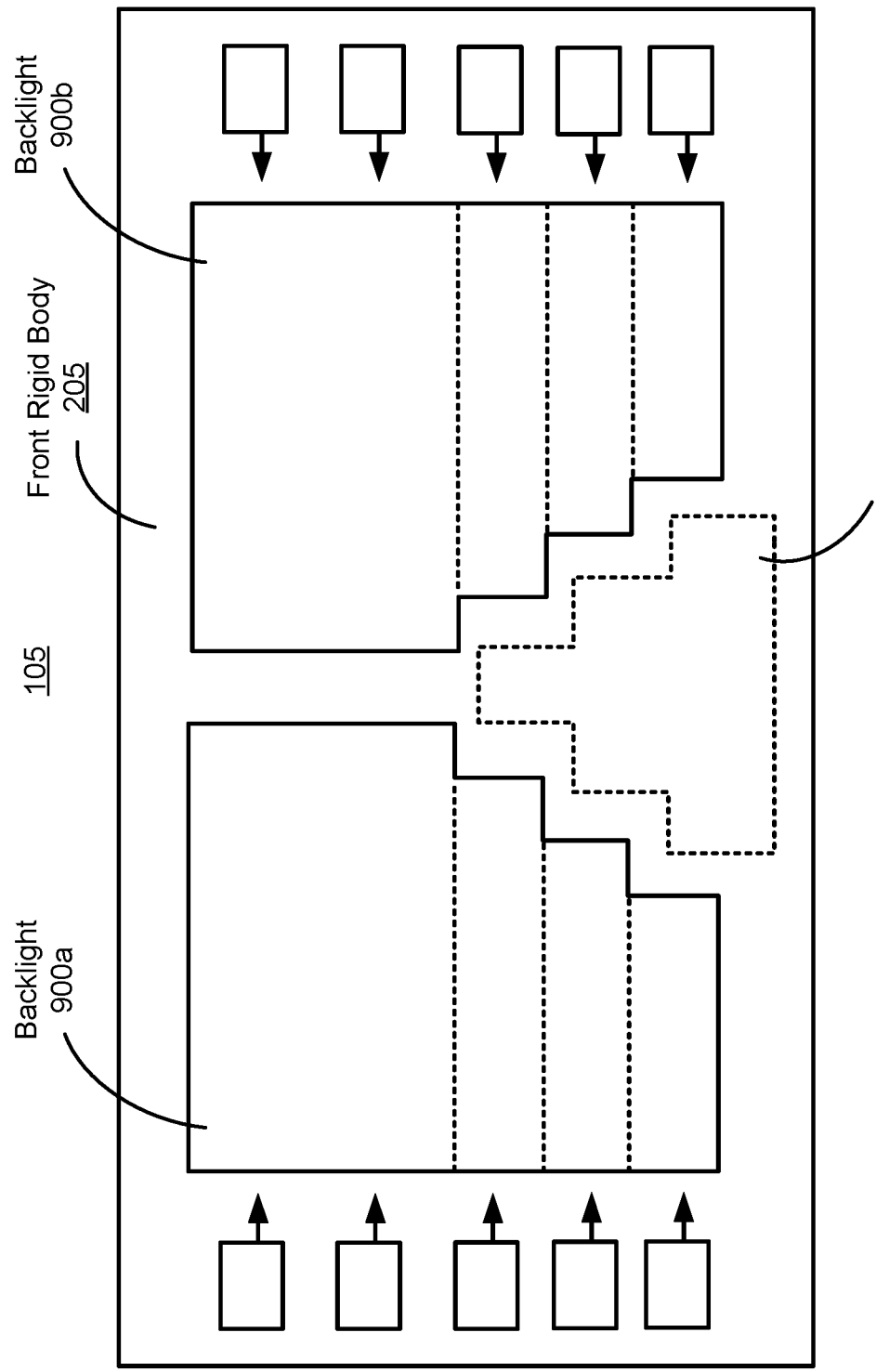
FIG. 11 shows multiple backlights disposed within a front rigid body of a HMD, in accordance with some embodiments.

FIG. 11 shows multiple backlights 900a and 900b within a front rigid body 205 of an HMD 105, in accordance with some embodiments. The backlight 900a is part of an electronic display for the left eye, and the backlight 900b is part of an electronic display for the right eye. The backlights 900a and 900b include light sources arranged along aligned light coupling surfaces. The corner cut profile shape the backlights 900a and 900b, and their corresponding corner cut profile shape LCD panels (e.g., disposed on top of the backlights, and not shown in FIG. 11 to avoid overcomplicating the drawing), define a middle open region 1102 that can accommodate placement of other components of the HMD 105, or placement of the user's nose.

Figure 12:
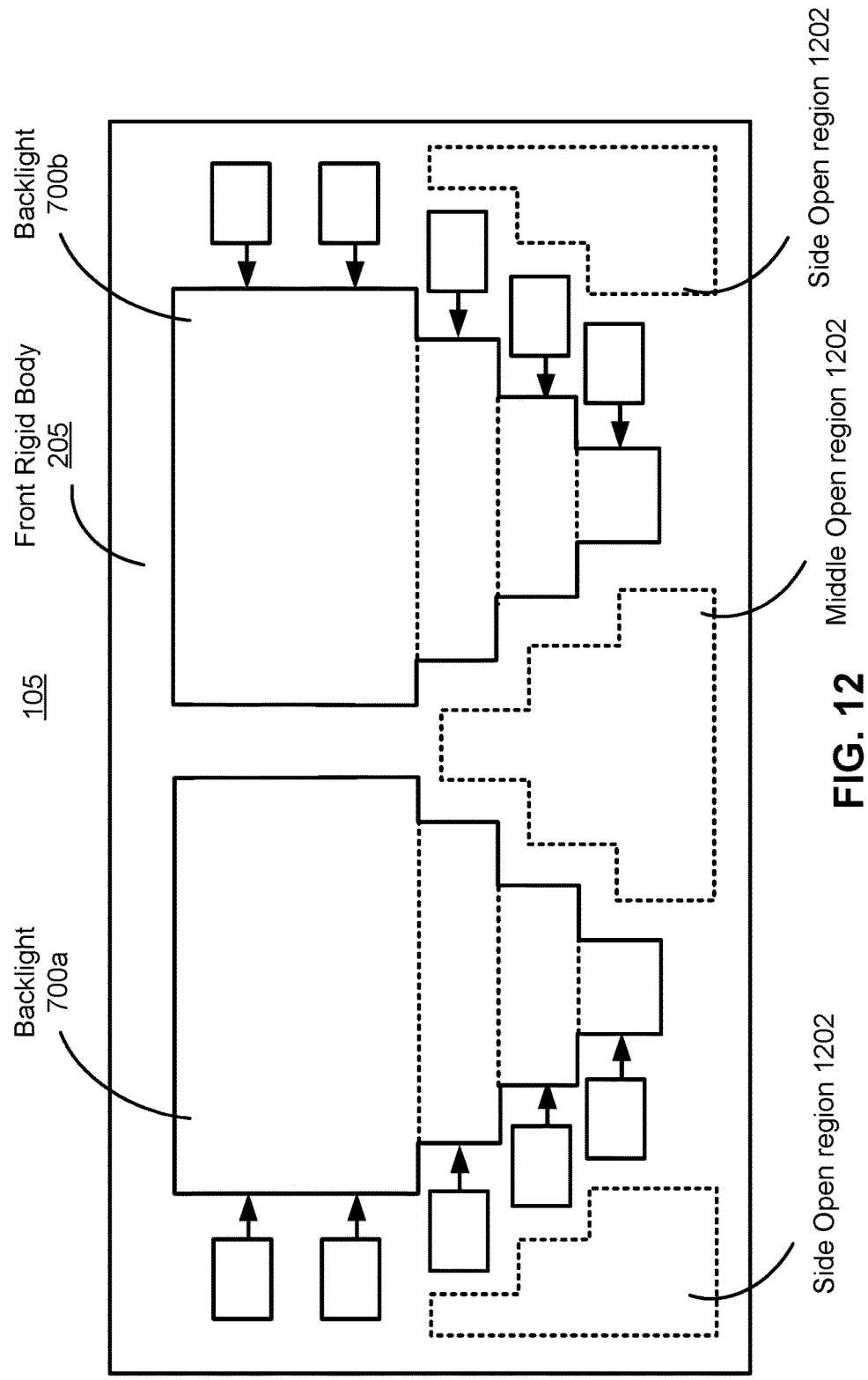
FIG. 12 shows multiple backlights disposed within a front rigid body of a HMD, in accordance with some embodiments.

FIG. 12 shows multiple backlights 700a and 700b within a front rigid body 205 of an HMD 105, in accordance with some embodiments. The backlight 700a is part of an electronic display for the left eye, and the backlight 700b is part of an electronic display for the right eye. The backlights 700a and 700b include light sources arranged along misaligned light coupling surfaces. The left and right backlights 700a and 700b, and their corresponding corner cut profile shape LCD panels (e.g., disposed on top of the backlights, and not shown in FIG. 12 to avoid overcomplicating the drawing), have the same structure and dimensions to facilitate efficient manufacturing. The left and right backlights 700a and 700b define a middle open region 1202 that can accommodate placement of other components of the HMD 105, or placement of the user's nose. The left and right backlights 700a and 700b also define side open regions 1202 on the left and right sides of the front rigid body 205 which can accommodate placement of other components.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A liquid crystal display (LCD) device, comprising:
an LCD panel including at least a first portion and a second portion adjacent to the first portion along a width dimension, the first portion having a first width along the width dimension and the second portion having a second width along the width dimension smaller than the first width; and
a backlight for illuminating the LCD panel, the backlight disposed behind the LCD panel and including:
a first light guide portion of a light guide disposed behind the first portion of the LCD panel, the first light guide portion having the first width along the width dimension;
a first light emitting diode (LED) disposed along a side surface of the first light guide portion to emit first light in a first direction along the first width of the first light guide portion, the first light guide portion receiving the first light from the first LED and directing the first light in a second direction toward the first portion of the LCD panel;
a second light guide portion of the light guide disposed behind the second portion of the LCD panel adjacent to the first light guide portion along the width dimension, the second light guide having the second width along the width dimension; and
a second LED disposed along a side surface of the second light guide portion to emit second light in the first direction along the second width of the second light guide portion, the second light guide portion receiving the second light from the second LED and directing the second light in the second direction toward the second portion of the LCD panel, wherein:
the first light guide portion includes a first variable thickness along the first width and the second light guide portion includes a second variable thickness along the second width; and
the first variable thickness decreases along the first width in the first direction more gradually than the second variable thickness decreases along the second width in the first direction.

2. The LCD device of claim 1, wherein the first light guide portion includes first extraction features having a first variable density along the first width and the second light guide portion includes second extraction features having a second variable density along the second width.

3. The LCD device of claim 2, wherein the first variable density of the first extraction features increases along the first width in the first direction less gradually than the second variable density of the second extraction features increases along the second width in the first direction.

4. The LCD device of claim 1, further including a controller configured to separately control switching of the first LED and the second LED.

5. The LCD device of claim 1, further including a controller configured to drive the first LED at a higher power than the second LED.

6. The LCD device of claim 1, wherein:
the LCD panel further includes a third portion adjacent to the second portion and having a third width smaller than the second width;
the backlight further includes:
a third light guide portion of the light guide disposed behind the third portion of the LCD panel adjacent to the second light guide portion, the third light guide portion having the third width; and
a third LED disposed along a side surface of the third light guide portion to emit third light in the first direction along the third width of the third light guide portion; and
the second portion of the LCD panel is between the first and third portions of the LCD panel such that the first, second, and third widths collectively define at least a portion of a corner cut profile of the LCD panel.

7. The LCD device of claim 1, wherein the backlight further includes a third LED disposed along a second side surface of the first light guide portion, the third LED emits third light in a third direction opposite the first direction along the first width of the first light guide portion, the first light guide receiving the third light from the third LED and directing the third light in the second direction toward the first portion of the LCD panel.

8. The LCD device of claim 7, wherein the backlight further includes a fourth LED disposed along a second side surface of the second light guide portion, the fourth LED emits fourth light in the third direction opposite the first direction along the second width of the second light guide portion, the second light guide portion receiving the fourth light from the fourth LED and directing the fourth light in the second direction toward the second portion of the LCD panel.

9. The LCD device of claim 1, wherein the side surface of the first light guide portion and the side surface of the second light guide portion are aligned.

10. The LCD device of claim 1, wherein the side surface of the first light guide portion and the side surface of the second light guide portion are misaligned.

11. A head-mounted display (HMD), comprising:
a left liquid crystal display (LCD) device and a right LCD device, each LCD device including:
an LCD panel including at least a first portion and a second portion adjacent to the first portion along a width dimension, the first portion having a first width along the width dimension and the second portion having a second width along the width dimension smaller than the first width; and
a backlight for illuminating the LCD panel, the backlight disposed behind the LCD panel and including:
a first light guide portion of a light guide disposed behind the first portion of the LCD panel, the first light guide portion having the first width along the width dimension;
a first light emitting diode (LED) disposed along a side surface of the first light guide portion to emit first light in a first direction along the first width of the first light guide portion, the first light guide portion receiving the first light from the first LED and directing the first light in a second direction toward the first portion of the LCD panel;
a second light guide portion of the light guide disposed behind the second portion of the LCD panel adjacent to the first light guide portion along the width dimension, the second light guide having the second width along the width dimension; and
a second LED disposed along a side surface of the second light guide portion to emit second light in the first direction along the second width of the second light guide portion, the second light guide portion receiving the second light from the second LED and directing the second light in the second direction toward the second portion of the LCD panel, wherein:

the first light guide portion includes a first variable thickness along the first width and the second light guide portion includes a second variable thickness along the second width; and the first variable thickness decreases along the first width in the first direction more gradually than the second variable thickness decreases along the second width in the first direction.

12. The HMD of claim 11, wherein the first light guide portion includes first extraction features having a first variable density along the first width and the second light guide portion includes second extraction features having a second variable density along the second width.

13. The HMD of claim 12, wherein the first variable density of the first extraction features increases along the first width in the first direction less gradually than the second variable density of the second extraction features increases along the second width in the first direction.

14. The HMD of claim 11, further including a controller configured to drive the first LED at a higher power than the second LED.

15. The HIVID of claim 11, wherein:

the LCD panel further includes a third portion adjacent to the second portion and having a third width smaller than the second width;

the backlight further includes:

a third light guide portion of the light guide disposed behind the third portion of the LCD panel adjacent to the second light guide portion, the third light guide portion having the third width; and a third LED disposed along a side surface of the third light guide portion to emit third light in the first direction along the third width of the third light guide portion; and the second portion of the LCD panel is between the first and third portions of the LCD panel such that the first, second, and third widths collectively define at least a portion of a corner cut profile of the LCD panel.

* * * * *

UNITED STATES PATENT AND TRADEMARK OFFICE
CERTIFICATE OF CORRECTION

PATENT NO. : 10,168,466 B2
APPLICATION NO. : 15/413097
DATED : January 1, 2019
INVENTOR(S) : Evan M. Richards, Shizhe Shen and Jianru Shi It is certified that error appears in the above-identified patent and that said Letters Patent is hereby corrected as shown below:

In the Claims

Column 16, Line 1, Claim 15, delete "The HIVID of claim 11," and insert -- The HMD of claim 11, --.

Signed and Sealed this
Ninth Day of July, 2019

Andrei Iancu
*Director of the United States Patent and Trademark Office*